US005520977A

United States Patent [19]

Snelling

[11] Patent Number: 5,520,977

[45] Date of Patent: May 28, 1996

[54] SELF BIASING TRANSFER ROLL

[75] Inventor: Christopher Snelling, Penfield, N.Y.

[73] Assignee: Xerox Corporation, Stamford, Conn.

[21] Appl. No.: 282,588

[22] Filed: Jul. 29, 1994

[51] Int. Cl.[6] ........................................ B32B 1/00

[52] U.S. Cl. .................... 428/36.9; 428/35.7; 428/35.8; 428/36.5; 428/411.1; 428/421; 428/457; 492/53; 492/49; 430/48; 430/126; 355/274

[58] Field of Search .............................. 428/35.7, 35.8, 428/36.5, 36.9, 421, 411.1, 457; 430/48, 126; 492/49, 53; 355/274

[56] References Cited

U.S. PATENT DOCUMENTS 5,065,194 11/1991 Sonnenberg ........................ 355/296

FOREIGN PATENT DOCUMENTS 699590 11/1979 U.S.S.R. .

OTHER PUBLICATIONS

"Cylindrical $PVF_2$ Electromechanical Transducers", D. H. Dameron et al., Sensors and Actuators, 2 (1981/82), pp. 73–84.

*Primary Examiner*—Patrick J. Ryan
*Assistant Examiner*—Marie R. Yamnitzky
*Attorney, Agent, or Firm*—Lloyd E. Bean, II

[57] ABSTRACT

A self biasable transfer roll system for transferring toner particles from an image support surface to a copy substrate, including a conformable roll member, comprising a core having a layer of compressible material radially surrounding the core, and a peripheral surface layer comprising piezoelectric material positioned along a circumference of the roll member for generating an electric field when deformed.

8 Claims, 3 Drawing Sheets

FIG. 1
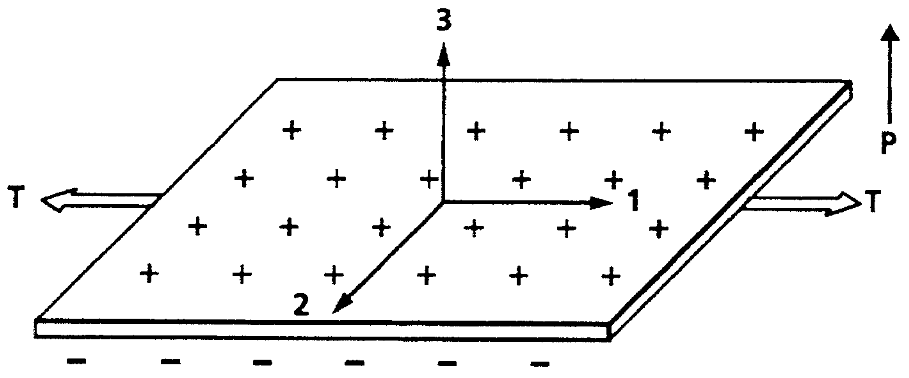
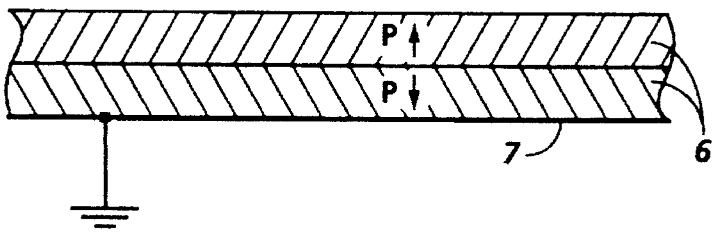
FIG. 2
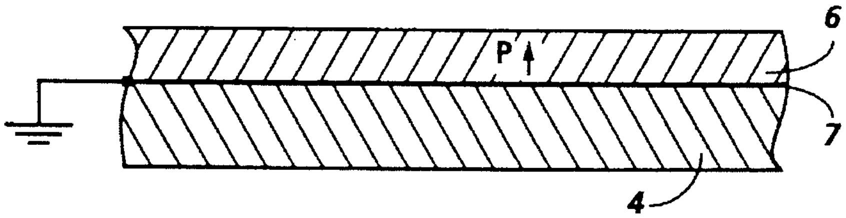
FIG. 3

SELF BIASING TRANSFER ROLL

The present invention relates generally to an apparatus for transfer of charged toner particles in an electrostatographic printing machine, and more particularly, concerns a transfer member having piezoelectric material for generating electric fields therefrom when compressed or strained.

Generally, the process of electrostatographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material onto the photoreceptive member such that the developing material is attracted to the charged image areas on the photoconductive surface. Thereafter, the developing material is transferred from the photoreceptive member to a copy sheet or to some other image support substrate to create an image which may be permanently affixed to the image support substrate, thereby providing an electrophotographic reproduction of the original document. In a final step in the process, the photoconductive surface of the photoreceptive member is cleaned to remove any residual developing material which may be remaining on the surface thereof in preparation for successive imaging cycles.

The electrostatographic copying process described hereinabove is well known and is commonly used for light lens copying of an original document. Analogous processes also exist in other electrostatographic printing applications such as, for example, digital laser printing where a latent image is formed on the photoconductive surface via a modulated laser beam, or ionographic printing and reproduction where charge is deposited on a charge retentive surface in response to electronically generated or stored images.

The operation of transferring developing material from the photoreceptive member to the image support substrate is realized at a transfer station. In a conventional transfer station, transfer is achieved by applying electrostatic force fields in a transfer region sufficient to overcome forces holding the toner particles to the surface of the photoreceptive member. These electrostatic force fields operate to attract and transfer the toner particles over to the copy sheet or other image support substrate. Typically, transfer of toner images between support surfaces is accomplished via electrostatic attraction using a corona generating device. In such corona induced transfer systems, the surface of the image support substrate is placed in direct contact with the toner image while the image is supported on the photoreceptive member. Transfer is induced by "spraying" the back of the support substrate with a corona discharge having a polarity opposite that of the toner particles, thereby electrostatically attracting the toner particles to the sheet. An exemplary ion emission transfer system is disclosed in U.S. Pat. No. 2,836,725.

Toner transfer has also been accomplished successfully via biased roll transfer systems. This type of transfer apparatus was first described by Fitch in U.S. Pat. No, 2,807,233, which disclosed the use of a metal roll coated with a resilient coating having an approximate resistivity of at least $10^6$ ohm-cm, that provides a means for controlling the magnetic and non-magnetic forces acting on the toner particles during the transfer process. Bias roll transfer has become the transfer method of choice in many state-of-the-art xerographic copying systems and apparatus, as can be found, for example, in the Model 9000 Series of machines manufactured by Xerox Corporation. Notable examples of bias roll transfer systems are described in U.S. Pat. No. 3,702,482 by C. Dolcimacsolo et al, and U.S. Pat. No. 3,782,205, issued to T. Meagher. Other general examples of bias roll transfer systems can be found in U.S. Pat. Nos. 3,043,684; 3,267,840; 3,328,193; 3,598,580; 3,525,146; 3,630,5911, 3,684,364; 3,691,992; 3,832,055; and 3,847,478, among others.

As described, the process of transferring toner materials via a bias roll transfer system in an electrostatographic apparatus involves the physical detachment and transfer over of charged particulate toner material from a first image support surface (i.e., a photoreceptor) into attachment with a second image support substrate (i.e., a copy sheet) under the influence of electrostatic force fields generated by an electrically biased roll member as well as charge being deposited on the second image support substrate. The previously referenced patent to Fitch indicates the utility for a roller configured so as to include an inner conductive member having a layer of high electrical resistance material, for transferring a toner powder image from the photoreceptor drum onto a print receiving web. That patent also discloses the use of such a roller member for charging the photoreceptor drum prior to the exposure of the original document to form an electrostatic latent image on the drum. Thus, roll members to which the present invention pertains have various uses in the electrostatographic process.

The critical aspect of the transfer process focuses on maintaining the same pattern and intensity of electrostatic fields as on the original latent electrostatic image being reproduced to induce transfer without causing scattering or smearing of the developer material. This essential and difficult criterion is satisfied by careful control of the electrostatic fields, which, by necessity, must be high enough to effect toner transfer while being low enough so as not to cause arcing or excessive ionization at undesired locations. Such electrical disturbances can create copy or print defects by inhibiting toner transfer or by inducing uncontrolled transfer which can easily cause scattering or smearing of the development materials.

The problems associated with successful image transfer are well known. In the pretransfer air gap region, or the so-called prenip region immediately in advance of copy sheet contact with the image, excessively high transfer fields can result in premature toner transfer across the air gap, leading to decreased resolution or blurred images. High transfer fields in the prenip air gap can also cause ionization, which may lead to loss of transfer efficiency, strobing or other image defects, and a lower latitude of system operating parameters. Conversely, in the post transfer air gap region or the so-called postnip region at the photoconductor-copy sheet separation area, insufficient transfer fields can give rise to image dropout and may generate hollow characters. Improper ionization in the postnip region may also create image stability defects and can give rise to copy sheet separation problems. Of course, the overriding consideration in providing an effective transfer system must focus on the transfer field generated in the transfer region which must be maximized in the area directly adjacent the transfer nip where the copy paper contacts the image so that high transfer efficiency and stable transfer can be achieved.

Hereinbefore, transfer and charging systems have required sources of high voltage at low current levels for maintaining the same pattern and intensity of electrostatic fields as on the original latent electrostatic image being reproduced to induce transfer. This requirement has been usually met by incorporating high voltage power supplies for feeding the coronas and bias rolls which perform such processes as precharge, development and transfer. These high voltage power supplies have added to the overall cost and weight of electrophotographic printers.

A simple, relatively inexpensive, and accurate approach to eliminated the expense and weight of traditional high voltage sources in such printing systems has been a goal in the design, manufacture and use of electrophotographic printers. The need to provide accurate and inexpensive transfer and charging systems has become more acute, as the demand for high quality, relatively inexpensive electrophotographic printers has increased.

Various techniques for charging without incorporating high voltage power supplies have hereinbefore been devised. U.S. Pat. No. 4,106,933 to Taylor teaches a method for printing using photoconductor with piezoelectric material having dipoles that are permanently poled to form a permanent pattern corresponding to a graphic representation. Subsequently, the permanently poled material can be used by straining the material to produce a charge pattern representative of the graphic representation, which can then be developed with toner powder, transferred to a sheet of paper, and fused to form a printed page. The straining, toning and fusing process may be repeated, thereby producing multiple copies. In a similar embodiment, U.S. Pat. Nos. 3,935,327 and 3,899,969 to Taylor discloses a method for copying a graphic representation using a uniformly poled pyroelectric material in a photoconductor. The material is selectively heated to form a differential charge pattern on the material that can be developed with charged toner particles to form a copy of the graphic representation.

However, even with the before mentioned disclosure the need for a discrete charging device which can be utilized on various photoreceptors without use of an external voltage supply still remains.

SUMMARY OF INVENTION

In accordance with one aspect of the present invention, there is provided a roll member, comprising an interior layer of compressible material, and an exterior surface layer comprising piezoelectric material positioned about said exterior layer for generating an electric field in response to being deformed.

In accordance with another aspect of the present invention, there is provided a self biasable transfer roll system for transferring toner particles from an image support surface to a copy substrate, including a conformable roll member, comprising an interior layer of compressible material, and an exterior surface layer comprising piezoelectric material positioned about said exterior layer for generating an electric field in response to being deformed.

BRIEF DESCRIPTION OF THE DRAWINGS

These and other aspects of the present invention will become apparent from the following description in conjunction with the accompanying drawings in which:

FIG. 1 is a perspective view illustrating the geometry of a piezoelectric sheet;

FIG. 2 is an elevational view illustrating a (bimorph) Xeromorph sheet which is utilized by the present invention;

FIG. 3 is an elevational view illustrating a (unimorph) Xeromorph sheet which is utilized by the present invention;

As indicated hereinabove, the present invention provides a novel roll member for use in an electrostatographic printing machine. While the present invention will be described with reference a preferred embodiment thereof, it will be understood that the invention is not limited to this preferred embodiment. On the contrary, it is intended that the present invention cover all alternatives, modifications, and equivalents as may be included within the spirit and scope of the invention as defined by the appended claims. Other aspects and features of the present invention will become apparent as the description proceeds.

Figure 4:
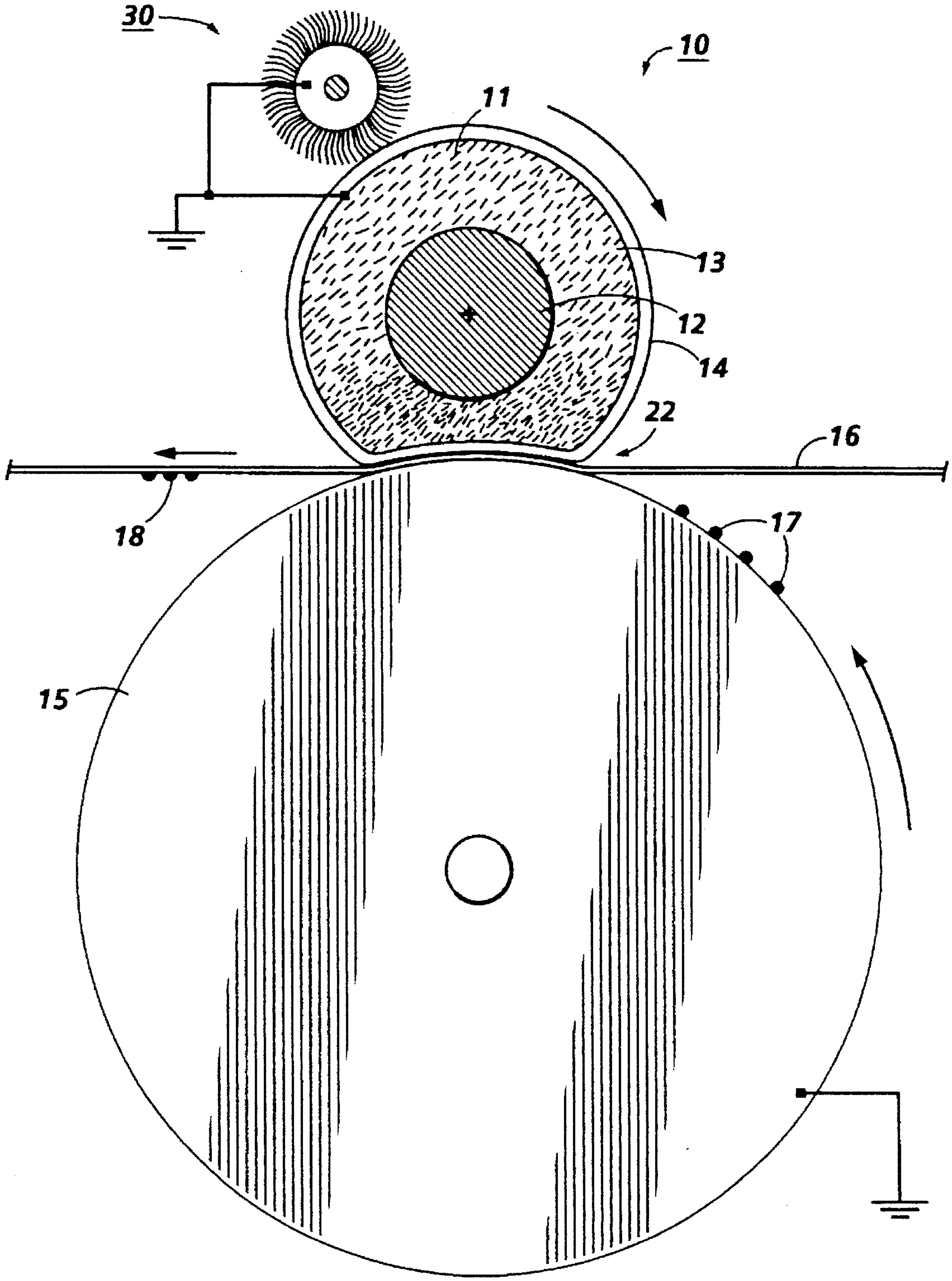
FIG. 4 is an elevational view illustrating the novel self biasing roll of the present invention in a transfer mode, as may be found in a typical electrostatographic copying process.

Referring now specifically to FIG. 4, a self biasing roll member 10 in accordance with the present invention is shown in the configuration of a transfer system of a typical electrostatographic printing machine. As can be seen from FIG. 4, the self biasing roll 10 of the present invention is shown thereat. A drum-type photoconductive insulating surface 15 is shown in operative engagement with the self biasing roll 10, forming a nip 22 therebetween. A powder toner image 17 previously formed and developed in accordance with conventional electrostatographic copying processes is present on the surface of the photoconductive insulating drum. A copy sheet 16 or other support substrate travels through the nip 22 formed in the area of contact between the self biasing roll 10 and the photoconductive insulating surface 15 for receiving the powder toner image 17 from drum 15. Thus, the powder toner image is transferred to the support sheet 16, appearing as a transferred image 18 thereon, by operation and inducement of the self biasing roll 10. The physics involved in using a conformable roll for the transferring process in such an electrostatographic printing apparatus is discussed in detail in U.S. Pat. No. 3,866,572 to Gundlach, incorporated by reference herein. The transferred image 18 on the support sheet 16 may be subsequently processed, for example, by fusing the image onto the support sheet.

It will be seen from FIG. 4 that the conformable roll 10 comprises a layer of compressible material 13 coated onto core 12. The roll member 10 is normally cylindrical with the layer 13 uniformly surrounding the central core 12 in a coaxial manner. The layer 13 may be comprised of a polyurethane formulation or any other material capable of providing desirable compressibility characteristics. This formulation may be closed cell or open cell, i.e., a foam material, which is sufficiently compressible. In addition, a peripheral surface layer 14 comprises a piezoelectric polymer film, such as polyvinylidene fluoride (PVDF) film, preferably Kynar® piezo film manufactured by Pennwalt KTM.

Piezoelectric materials are formed by stretching PVDF film in one direction, and applying a large electric field to electrically polarize it in a direction perpendicular to the film. As shown in FIG. 1, the stretch direction is denoted by "1" and the polarization direction is denoted by "3". When a PVDF sheet is strained, it develops an internal electric field which is proportional to the deformation.

The present invention utilizes either a bimorph or a unimorph structure referred to as a "Xeromorph". A bimorph Xeromorph consists of two PVDF sheets 6 laminated together with each sheet polarization direction opposed to each other having only a bottom electrode 7, as shown in FIG. 2. An unimorph Xeromorph consists of a single PVDF sheet 6 laminated to a thick substrate 4 as shown in FIG. 3. The substrate material may comprise materials which can be bent, and have no piezoelectric properties.

Xeromorph surface layer 14 is sufficiently elastic and resilient to yield to the compressible characteristics of the conformable underlying layer 13. It will be appreciated that conformable roll 10 is subjected to a compressive force in the nip 22 formed in the area of contact between the roll 10 and the photoconductive drum 15. As roll 10 is brought into much closer proximity to the photoconductive surface 15, upon which the powder toner image is located, the compressive force causes deformation of the piezoelectric layer such that an electric potential is generated on the surface of roll 10 in the nip region in order to induce transfer of the powder toner image to copy sheet 16. Conformable roll 10 is maintained in tension by a pair of springs (not shown) resiliently urging conformable roll 10 against drum with the desired spring force to deform conformable roll 10 to generate the desired electric potential. It should be evident other means for urging conformable roll surface 10 against drum 15 could be employed. Also, it will be appreciated that as conformable roll 10 rotates, neutralization and cleaning brush 30 cleans the surface of conformable roll 10 and eliminates residue charges thereon so that there is no electric field in the prenip region prior to deformation.

It will be evident from the present description that deforming of the peripheral surface layer 14 in the transfer nip 22 can be increased such that higher transfer fields can be applied to achieve high transfer efficiencies if necessary.

Figure 5:
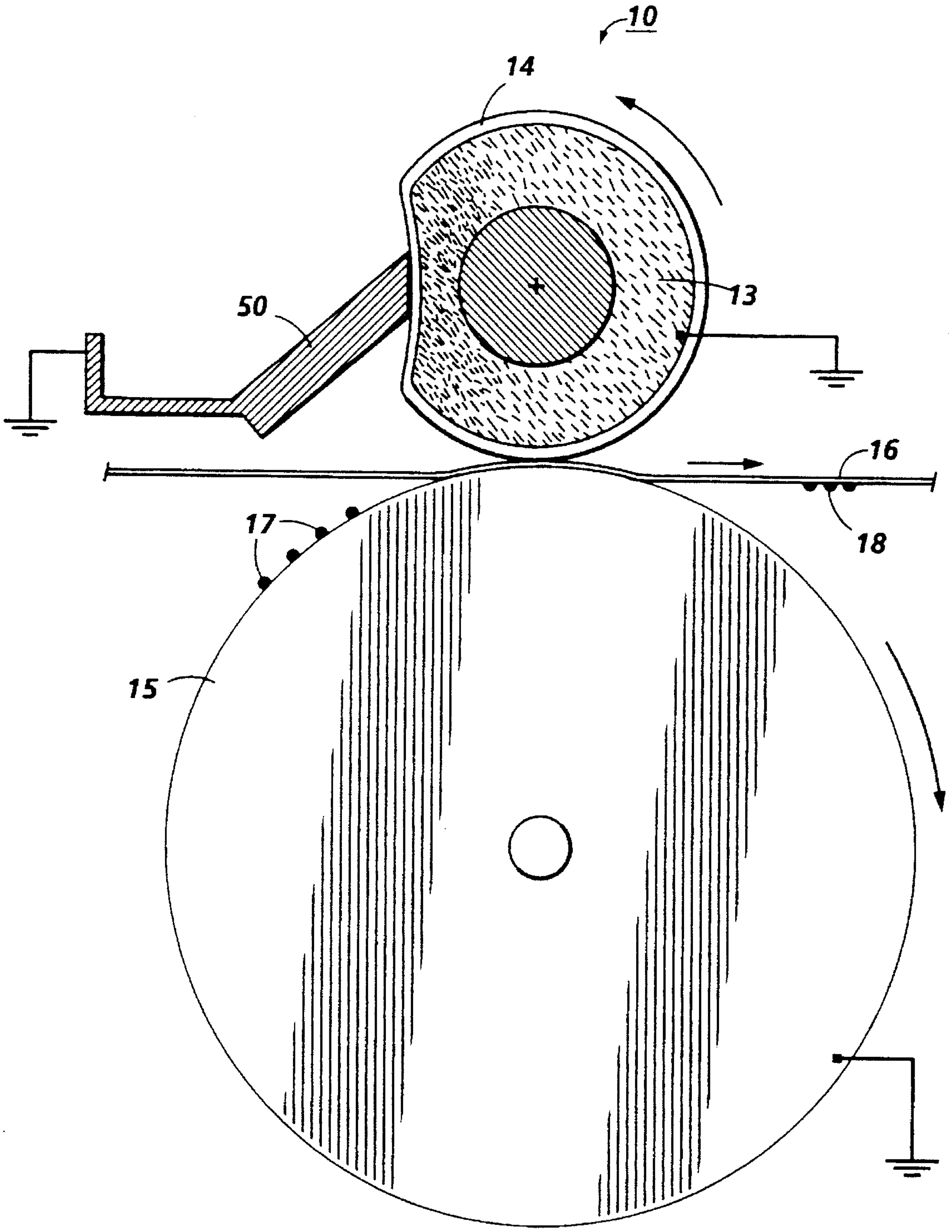
FIG. 5 illustrates the novel self biasing roll of the present invention employing a conductive blade.

Another embodiment of the present invention is illustrated in FIG. 5. Conformable roll 10 is subjected to a compressive force applied by conductive blade 50. Blade 50 serves three functions: 1) deform Xeromorph surface layer to create a net charge and non-zero potential; 2) neutralize this non-zero surface potential by commutating this net charge to ground through the conductive blade; 3) clean debris from the surface of the Xeromorph surface layer. An advantageous feature of this specific embodiment is the independence from nip pressure to generate the desired electrical potential on the surface of the roll thereby eliminating the possibility of excess nip pressure which can result in hollow character images due to compaction of toner against the surface of the photoconductive member. It should be noted that sufficient nip pressure should be applied to minimize the transfer zone air gap.

The roll member of the present invention is operated in a synchronous mode in which the roll rotates in the same direction as the photoconductive surface. Alternatively, it is contemplated that the conformable roll member of the present invention can be operated in an asynchronous mode, in which the roll rotates in the opposite direction as the image receiver and the photoconductive surface, as described in co-pending application Ser. No. 08/283,337 (D/94343) filed concurrently herewith on Jul. 27, 1994, entitled "SELF BIASING CHARGING MEMBER" in which the entire contents thereof are hereby incorporated by reference.

It is, therefore, evident that there has been provided, in accordance, with the present invention, a self-biasable transfer roll member that fully satisfies the aims and advantages of the invention as hereinabove set forth. While the invention has been described in conjunction with preferred embodiments thereof, it is evident that many alternatives, modifications, and variations may be apparent to those skilled in the art. Accordingly, the present application for patent is intended to embrace all such alternatives, modifications, and variations as are within the broad scope and spirit of the appended claims.

I claim:

1. A roll member adapted for contact with a surface to generate an electric field in response to being deformed, comprising:

an interior layer of compressible material including a core and a layer of compressible material entrained about said core; and an exterior layer comprising piezoelectric material positioned about said interior layer and an electrode in contact with said piezoelectric material and said interior layer of compressible material, said piezoelectric material includes a first layer of piezoelectric polymer film having a first polarization direction and a second layer of piezoelectric polymer film disposed on said first layer and having a second polarization direction opposed to the first direction.

2. A self biasable transfer roll system for transferring toner particles from an image support surface to a copy substrate, including a conformable roll member, comprising:

an interior layer of compressible material;

an exterior layer comprising piezoelectric material positioned about said interior layer and an electrode in contact with said piezoelectric material and said interior layer of compressible material; and means for deforming the piezoelectric layer to generate a electric field.

3. The transfer roll system of claim 2, wherein said interior layer comprises:

a core; and a layer of compressible material entrained about said core.

4. The transfer roll system of claim 3, wherein said piezoelectric material comprises a layer of piezoelectric polymer film.

5. The transfer roll system of claim 3, wherein said piezoelectric material comprises:

a first layer of piezoelectric polymer film having a first polarization direction; and a second layer of piezoelectric polymer film disposed on said first layer and having a second polarization direction opposed to the first direction.

6. The transfer roll system of claim 3, further comprising means for urging the conformable roll into contact with the imaging support surface to deform the conformable roll in a nip region therebetween.

7. The transfer roll system of claim 2, wherein said deforming means includes a blade which deforms the roll and, cleans and eliminates residue charges on the exterior surface layer thereof.

8. The transfer roll system of claim 7, further comprising a brush for cleaning the surface of the conformable roll and eliminating residue charges thereon.

* * * * *